Figure 1:
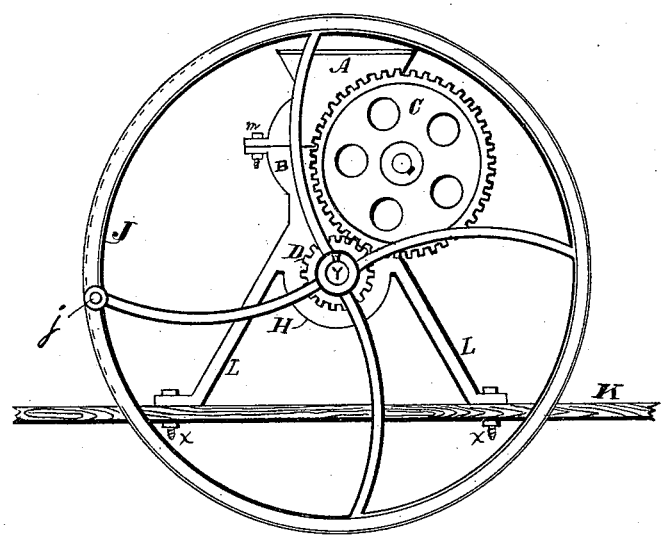

(No Model.) 2 Sheets—Sheet 1.

J. F. CUSTARD.
GRINDING MILL.

No. 348,153. Patented Aug. 24, 1886.

WITNESSES:
Charles P. Gernerd
David D. McKenna

Inventor.
Joseph F. Custard
BY G. G. Oplinger
ATTORNEY (No Model.) 2 Sheets—Sheet 2.
J. F. CUSTARD.
GRINDING MILL.
No. 348,153. Patented Aug. 24, 1886.
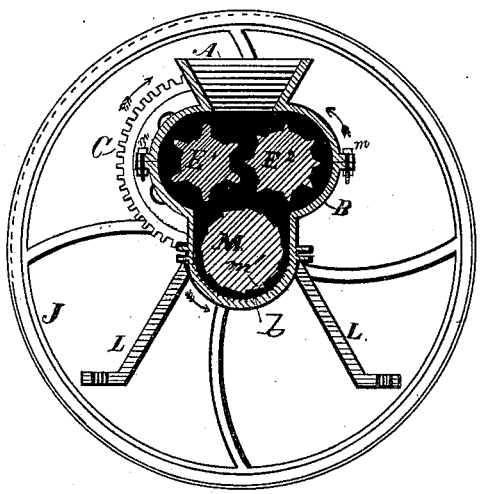
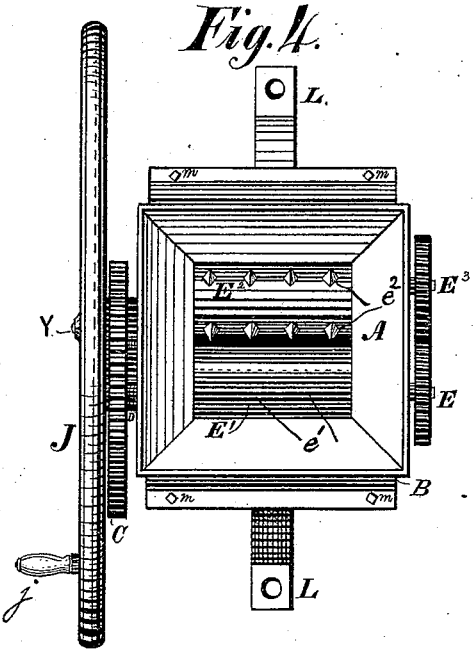
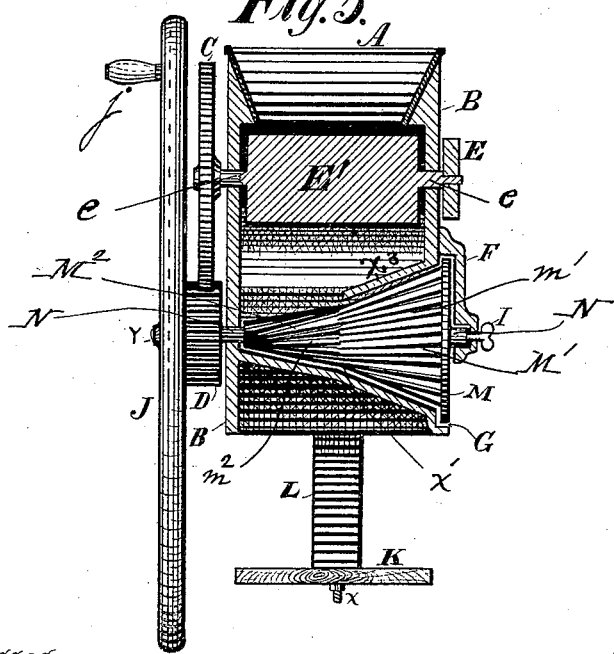
Witnesses:
Inventor:
Joseph F. Custard
BY ATTORNEY

UNITED STATES PATENT OFFICE.

JOSEPH F. CUSTARD, OF SLATINGTON, PENNSYLVANIA, ASSIGNOR OF ONE-HALF TO WILLIAM A. FULZENGER, OF SAME PLACE.

GRINDING-MILL.

SPECIFICATION forming part of Letters Patent No. 343,153, dated August 24, 1886.

Application filed March 12, 1886. Serial No. 194,958. (No model.)

*To all whom it may concern:*

Be it known that I, JOSEPH F. CUSTARD, a citizen of the United States, residing at Slatington, in the county of Lehigh and State of Pennsylvania, have invented a new and useful Grinding-Mill, of which the following is a specification, reference being had to the accompanying drawings.

The invention relates to mills for grinding bones, shells, and similar material, and may be used for grinding cereals; and it consists in the construction and novel arrangement of parts hereinafter described, illustrated in the drawings, and pointed out in the claims hereto appended.

Figure 2:
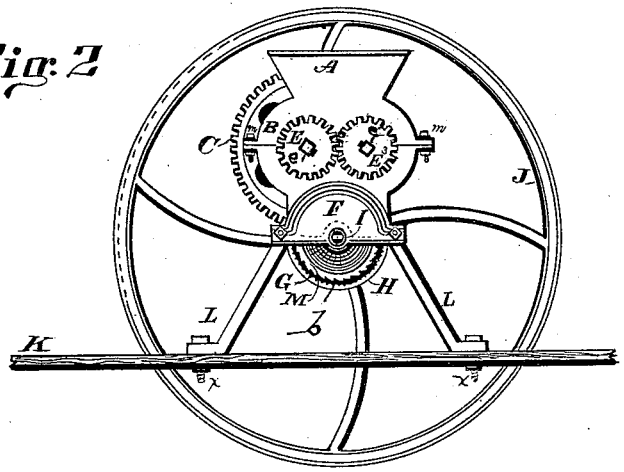

In the accompanying drawings, Figure 1 represents a side view of my improved mill. Fig. 2 represents a view of the opposite side of the same. Fig. 3 represents a vertical transverse section of the mill, the arrows showing the direction of the rotation of the rolls. Fig. 4 represents a plan view of the same, looking into the hopper. Fig. 5 represents a vertical longitudinal section thereof.

Referring to the accompanying drawings, A designates the hopper, forming the upper portion of the casing of the mill. The lower part, B, of the casing is provided with the legs L L, having their feet secured by bolts $x x$ to a proper support, K, which may be a table of ordinary construction. The meeting edges of the parts A B are flanged, as shown, and bolted together through openings in said flanges, $m\, m$ designating the bolts.

$E'\, E^2$ are the crushing rolls or cylinders, having their bearings $e\, e$ journaled in the sides of the mill-casing, the bearings being on the meeting edges of the parts A B. The cylinder $E'$ is provided with longitudinal equidistant and parallel ribs $e'$, extending its entire length, and the cylinder $E^2$ is provided with equidistant longitudinally-parallel sets of teeth $e^2$.

E $E^3$ are equal-sized gear-wheels on the extended shafts of the cylinders $E'\, E^2$, respectively. The said gear-wheels mesh together, giving the cylinders the same speed of rotation. The casing A B is enlarged about centrally, so that the cylinders $E'\, E^2$ can rotate freely therein.

M is a grinding-roll of general conical shape, but having its larger end, $M'$, formed on the frustum of a cone of steeper angle than its end $M^2$, as seen in Fig. 5, the two parts forming between them the relative re-entrant angle $x'$. Each part $M'\, M^2$ is provided with longitudinal corrugations or ribs $m'\, m^2$, respectively, the said ribs having in transverse section the contour of ratchet-teeth, with their points in the direction of the proper rotation of the roll M.

N N are the journals of the roll M, one of which, at the smaller end of said roll, has bearings in the casing of the mill. The other journal has a bearing in a plate or bracket, F, which stands from and forms part of the casing on the side of the larger end of the roll M.

I is an adjusting-screw, the function of which will be hereinafter explained. The lower portion of the part B of the casing is made concentric with the roll M, and provided on its interior surface with longitudinal corrugations or ribs $b$, against which the corrugations on the roll M grind the material descending from the crushing-cylinders. By means of the screw I, the roll M can be set farther in the casing, so as to grind the material finer, and by loosening said screw the mill will grind coarser, as the descending material will force the roll M farther outward.

D is a gear-wheel on the extended journal of the roll M, at the smaller end of the same. The wheel D meshes with the gear-wheel C on the extended journal of the grinding-cylinder $E'$. The journal N is extended beyond the gear-wheel D, and has secured upon it the fly-wheel J, which is kept in place by the nut $y$ on the tapped end of the journal.

$j$ is the handle by which the wheel J is turned and the machine operated.

From the forgoing it is evident that when the fly-wheel is turned in the proper direction the cylinders $E'\, E^2$ will rotate toward each other, crushing the material descending from the hopper, and that the material descending from said cylinders will be ground between the roll M and the corrugated surface of the casing, and will escape into any proper receptacle through the outlet at G, between the casing and the larger end of the roll M. The material is received upon the smaller part, $M^2$, of the grinding-roll, being directed there by the inner inclined portion, $x^3$, Fig. 5, of the casing. It then descends to the larger portion, passing downward over the cylinder.

Having described my invention, I claim—

1. The combination of the conical grinding-roll M, the lower corrugated part of the casing concentric with said roll, the crushing-cylinder E', provided with the equidistant ribs $e'$, the crushing-cylinder $E^2$, provided with the equidistant teeth $e^2$, and means, substantially as described, to cause both cylinders and the roll M to operate simultaneously, substantially as specified.

2. The herein-described crushing and grinding mill, composed of the hopper A, casing B, the crushing-cylinders E' $E^2$, respectively provided with the ribs $e'$ and teeth $e^2$, the conical grinding-roll M, composed of the parts M' $M^2$, respectively provided with the corrugations $m'$ $m^2$, the lower part of the casing having the ribs $b$ on its interior, and equal-sized gear-wheels E $E^3$, gear-wheels C D, the fly-wheel J, and the screw I, whereby the roll M is adjusted to grind fine or coarse, all constructed and arranged to operate substantially as and for the purpose specified.

JOSEPH F. CUSTARD.

Witnesses:
CHARLES P. GERNERD,
DAVID McKENNA.

It is hereby certified that the name of the assignee in Letters Patent No. 348,153, granted August 24, 1886, upon the application of Joseph F. Custard, of Slatington, Pennsylvania, for an improvement in "Grinding Mills," was erroneously written and printed "William A. Fulzinger," whereas said name should have been written and printed *William A. Fritzinger;* and that the Letters Patent should be read with this correction therein that the same may conform to the record of the case in the Patent Office.

Signed, countersigned, and sealed this 14th day of September, A. D. 1886.

[SEAL.]

D. L. HAWKINS,
*Acting Secretary of the Interior.*

Countersigned:
  R. B. VANCE,
    *Acting Commissioner of Patents.*